United States Patent [19]

Satterthwaite

[11] 3,749,464

[45] July 31, 1973

[54] LUBRICATION SYSTEM FOR BEARINGS

[75] Inventor: James Glenn Satterthwaite, Portsmouth, Va.

[73] Assignee: The Johnson Rubber Company, Middlefield, Ohio

[22] Filed: Sept. 2, 1971

[21] Appl. No.: 177,334

[52] U.S. Cl................ 308/36.1, 308/36.3, 308/112
[51] Int. Cl. ............................................ F16c 33/74
[58] Field of Search........... 308/36.1, 36.3, DIG. 12, 308/112; 184/6 R

[56] References Cited
UNITED STATES PATENTS

| | | | |
|---|---|---|---|
| 3,400,937 | 9/1968 | Crankshaw | 308/36.3 |
| 3,514,167 | 5/1970 | Wahl, Jr. | 308/36.3 |
| 3,689,082 | 9/1972 | Macy, Jr. et al. | 277/34 |

Primary Examiner—Charles J. Myhre
Assistant Examiner—Barry Grossman
Attorney—McNenny, Farrington, Pearne & Gordon

[57] ABSTRACT

A forced lubricated bearing system is disclosed in which means are provided to recirculate lubricant leakage back to the bearing. In the illustrated embodiments, a water lubricated rubber bearing journals the shaft of a marine propulsion system or a pump. Water is pumped into the bearing for lubrication. A restricter limits the leakage rate from at least one end of the bearing. The leakage is collected and returned by an aspirator type pump in the lubricant supply line to the bearing. An inflatable seal operates to prevent leakage when the shaft is stationary and lubricant is not supplied to the bearing. In some instances, the inflatable seal is partially inflated to restrict the rate of leakage when the shaft is moving.

12 Claims, 8 Drawing Figures

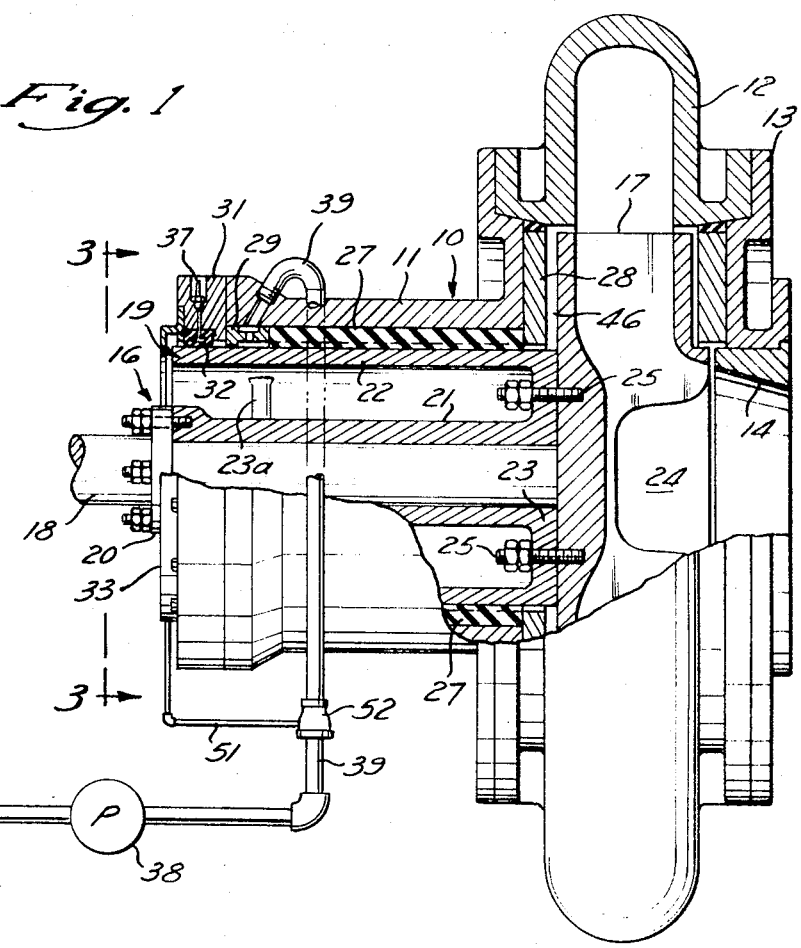
Fig. 1
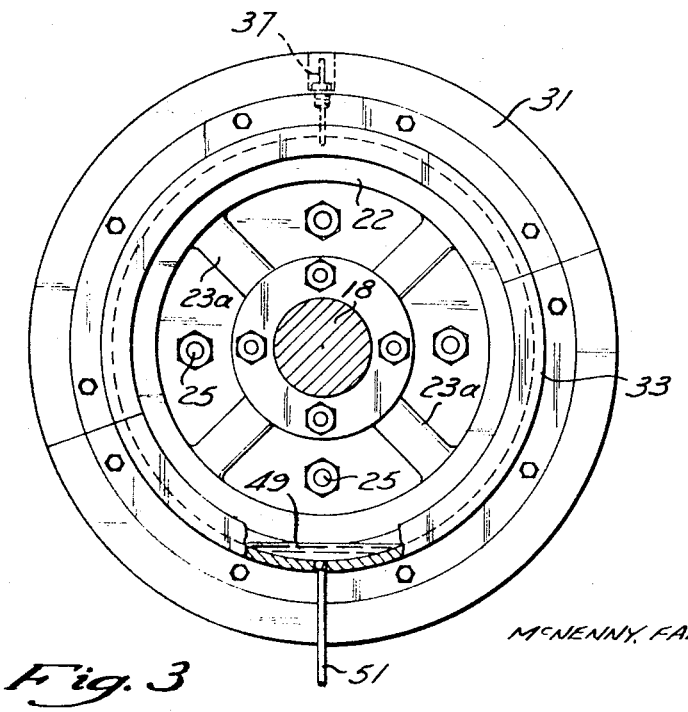
Fig. 3
Fig. 4
INVENTOR.
JAMES GLENN SATTERTHWAITE
BY
McNENNY, FARRINGTON, PEARNE & GORDON
ATTORNEYS INVENTOR.
JAMES GLENN SATTERTHWAITE
BY
McNENNY, FARRINGTON, PEARNE & GORDON
ATTORNEYS INVENTOR.
JAMES GLENN SATTERTHWAITE
BY
McNENNY, FARRINGTON, PEARNE & GORDON
ATTORNEYS

LUBRICATION SYSTEM FOR BEARINGS

BACKGROUND OF THE INVENTION

This invention relates generally to bearing lubrication systems and more particularly to a novel and improved force lubrication system for water lubricated bearings or the like in which means are provided to recirculate lubricant leakage.

Water lubricated bearings are often used to support rotating shafts for pump and marine propulsion systems or the like. In many such systems, glands or seals are provided to limit leakage of the lubricant from at least one end of the bearing. However, such glands or seals must usually be adjusted to permit some leakage so that they are themselves lubricated and cooled sufficiently to prevent rapid wear. In many instances, such leakage presents severe problems. For example, in marine installations the leakage normally accumulates in the bilge where it mixes with other leakage and waste. Because of such leakage, the bilges must be pumped with greater frequency. This is particularly undesirable since the pumping of bilges contributes to the polution problem that exists in many waterways. In other instances, for example in mines or the like, the disposal of accumulated leakage presents severe problems.

PRIOR ART

In the pending application, Ser. No. 8,278, filed Feb. 3, 1970, an inflatable seal is disclosed which is inflated to provide a positive seal with the propeller shaft of a vessel when the vessel is not under way and the shaft is not turning. Such seal reduces the amount of leakage accumulation but does not prevent all the leakage since it is not fully inflated to positively prevent leakage when the vessel is under way.

SUMMARY OF THE INVENTION

In accordance with the preferred form of the present invention, a water lubricated bearing system is provided which includes means to automatically collect the leakage of lubricant and to recirculate such leakage back through the bearing. In such system, none of the leakage accumulates. When the system is employed in a marine vessel, the leakage does not reach the bilge and, therefore, does not contribute to the accumulation of waste in the bilge. When the system is used in a nonmarine installation, it eliminates the need to dispose of the leakage.

In accordance with one important aspect of this invention, the leakage is automatically pumped back into the lubricant supply and is returned to the bearing. In the illustrated embodiment, the lubricant under pressure, as it flows to the bearing, passes through a jet or aspirator type pump to draw the leakage back into the lubricant supply system which carries the lubricant to the bearing. Therefore, it is not necessary to provide separate power means and separate pumping means to recirculate the leakage. Also, the suction of the main lubricant pump cannot be adversely affected by temporary evacuation of the seal leakage recirculation line which is located on the discharge side of the main lubricant pump.

In accordance with another aspect of this invention, an inflatable seal is utilized during the operation of the system to limit the rate of leakage from one end of the bearing to the desired rate. However, when the equipment is not operating and the shaft is stationary, such seal is further inflated to positively seal and prevent all leakage. Thus, a single seal performs the dual functions of controlling leakage under operating conditions and entirely preventing leakage under nonoperating conditions.

BRIEF DESCRIPTION OF THE DRAWINGS

FIG. 1 is a side elevation partially in section of a pump, the rotor of which is journaled in a water lubricated rubber bearing and which is provided with a forced lubrication system in accordance with this invention;

FIG. 3 is an end view taken generally at 3—3 of FIG. 1 with the collector ring partially broken away for purposes of illustration;

FIG. 4 is an enlarged fragmentary section of the aspirator for pumping the leakage back into the bearing;

DETAILED DESCRIPTION OF THE DRAWING

Figure 2:
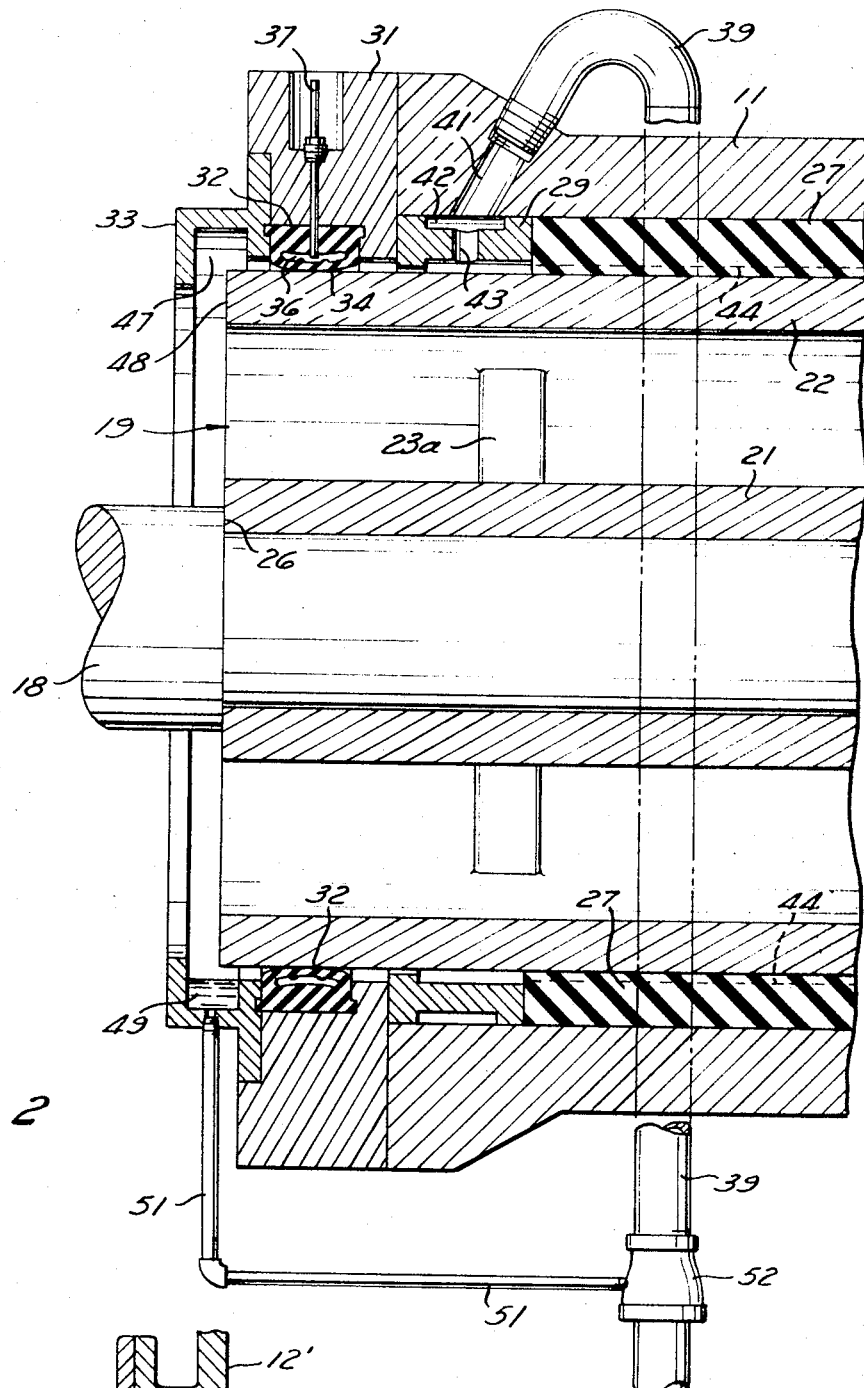
FIG. 2 is an enlarged fragmentary section of the pump of FIG. 1 illustrating the inflatable flow restricter and seal, and also illustrating the leakage collector system.

FIGS. 1 through 4 illustrate a pump system incorporating this invention. The illustrated pump is of the type often used in hydraulic dredges, slurry pump operations and the like. Such pump is provided with a housing assembly 10 consisting of a bearing support housing section 11, a main pump housing section 12, and an inlet housing section 13. An inlet ring 14 is carried by the inlet housing section 13.

A rotor or impeller assembly 16 includes an impeller 17, a drive shaft 18, and a bearing sleeve 19. In the illustrated embodiment, the bearing sleeve 19 includes an inner tubular section 21, drivingly connected to a flange 20 on the end of the drive shaft 18, and a relatively large cylindrical journal hub or bearing section 22 joined to the inner tubular section 21 by an end wall 23 and supports 23a. The end wall 23 is secured tightly against the adjacent surface of the impeller 17 by stud bolts 25.

Mounted in the bearing support housing section are a plurality of rubber staves 27 which cooperate to encircle the outer tubular bearing section 22 and provide a water lubricated rubber bearing in which the impeller assembly 16 is jounaled. Preferably, the staves 27 are subjected to endwise releasable compressive stress to secure them in position in the manner disclosed in the pending application, Ser. No. 653,796, filed July 17, 1967. The staves are compressed axially between a head liner 28 mounted in the housing assembly 10 and a lantern ring 29. The lantern ring 29 is secured in position by an end housing 31 secured to the end of the housing section 11 by bolts (not illustrated).

An inflatable ring 32 formed of elastomeric material is secured in the end housing 31 by a collector ring 33 secured to the end housing by bolts (not illustrated). The ring 32 provides a flexible wall 34 and an air chamber 36 which is pressurized to move the wall toward the outer bearing surface of the bearing section 22. Reference should be made to the pending application, Ser. No. 8,278, filed Feb. 3, 1970 for a detailed description of the structure and operation of such an inflatable ring. A valved stem assembly 37 communicates with the chamber 36 to permit it to be pressurized or exhausted as required.

Lubricating water is supplied to the bearing under pressure by a water pump 38 schematically illustrated in FIG. 1 through a supply line 39 connected to an inlet port 41 formed in the housing section 11 adjacent to the lantern ring 29. The lantern ring is formed with an external distribution groove 42 which communicates through a plurality of radial ports 43 symmetrically located around the ring to the interior of the ring. This insures that the supply of water lubricant is evenly distributed around the bearing.

When the lubricating water is supplied to the bearing, the majority of the water flows along lubricating grooves 44 formed in the staves 27 to lubricate the bearing. The majority of the lubricant is exhausted or discharged from the bearing at the impeller end thereof and flows out through the space 46 between the housing and the impeller 17 where it is discharged with the main pump discharge through a discharge opening in the pump (not illustrated). Some of the lubricant, however, flows in the opposite direction along the bearing section 22 past the inflatable ring 32 as lubricant leakage. The ring 32 is inflated to an extent which will permit a controlled amount of leakage therepast when the pump is operating. It is necessary to provide a limited amount of leakage so that the inner wall 34 is adequately lubricated to insure minimum wear and drag losses on the journal surface.

The flow of such leakage continues along the housing and the bearing section 22 until it reaches a collector groove 47 formed in the collector ring 33. The radial wall 48, which faces in a direction axially away from the bearing surface and which is located within the ring 33, serves as a stop for such flow. The centrifugal force on a leakage of lubricant flowing along the bearing section 22 causes such leakage to be thrown outwardly into the collector groove 47 and prevents it from flowing radially inward along the end wall 48. The lubricant leakage flows down along the collector groove and is collected at the bottom thereof at 49.

A return line 51 is connected between the bottom of the collector groove and an aspirator pump 52 to return the collected leakage to the supply line 39. Referring to FIG. 4, the aspirator pump includes an aspirator housing 53 cooperating with the upstream portion 54 of the supply line 39 to define an annular chamber 56 to open to the inlet end of the downstream portion 57 of the supply line 39. The return line 51 connects to the chamber 56. When water is flowing through the aspirator, a vacuum is developed in the chamber 56 and the jet of lubricant passing through the aspirator pumps the leakage back into the downstream portion 57 of the supply line and returns it to the bearing. It should be understood that other types of jet pumps or the like, such as Venturi type pumps, may be used to pump the leakage lubricant back into the supply line. In the illustrated pump, the upstream portion 54 of the supply line 39 is shaped to provide a nozzle which produces a jet directed into the downstream portion 57. In any event, the aspirator pump is capable of producing a sufficient suction head to pump the accumulated lubricant leakage through the return line 51 back into the supply line 39 at all times during operations.

If the pump 12 is utilized in a system wherein a positive pressure exists in the pump chamber when the pump is not operating, the inflatable ring 32 is pressurized at such time a sufficient amount to provide a positive seal with the bearing journal section 22 to positively prevent leakage of water out of the bearing, since the flow of lubricant would not normally be provided during such periods, and the aspirator 52 would then not be able to pump away the accumulated leakage. In such a system, a check valve is provided in the supply line 39 between the bearing and the aspirator 52 to prevent reverse flow. In such a system, the ring is deflated prior to the commencement of operation of the pump a sufficient amount to again allow a controlled leakage of lubricant past the ring to prevent damaging wear to the ring.

In the past, glands having packing rings, radially loaded lip seals or the like have generally been provided to minimize or control the leakage from the bearing. Such packing rings, even through they are normally adjusted to allow a limited amount of leakage, provide a substantial friction and, consequently, consume power. With the illustrated structure in which a rubber ring is controllably inflated to permit a desirable rate of leakage so that sufficient lubrication of the seal surface is provided and a very low friction is encountered and much less power is wasted. Consequently in a pump in accordance with the illustrated embodiment, a greater percentage of the power supplied to the pump is utilized to actually pump material, and far less power is lost in friction. Consequently, efficiency is improved substantially while seal leakage by conventional standards is entirely eliminated.

Figure 5:
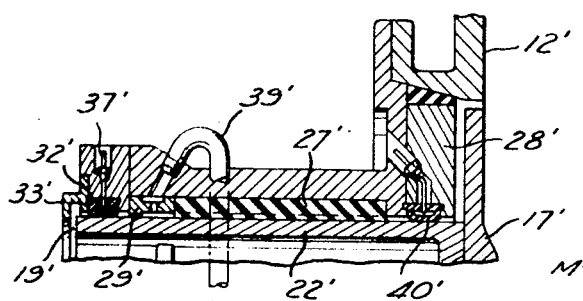
FIG. 5 is a fragmentary longitudinal section of a modified bearing system in which a leakage restricter is provided at both ends of a pump bearing.

FIG. 5 illustrates a pump bearing system similar to FIGS. 1 through 4. However, in this embodiment flow restricters are provided at both ends of the bearing. Similar reference numerals will be used to designate similar parts with a prime (') added to indicate references being made to the embodiment of FIG. 5. Here again, the impeller 17' is supported by a bearing sleeve 19' within water lubricated rubber bearing staves 27' which encircle the outer journal hub or bearing section 22'. Water lubricant is supplied to the bearing through a supply line 39' and a lantern ring 29' in the same manner as the first embodiment. Also, an inflatable ring 32' is mounted at the outer end of the bearing to control the leakage from that end of the bearing. Leakage past the ring 32' is again collected within a collector ring 33' and returned to the supply line 39' by an aspirator pump in the same manner as in the first embodiment of FIGS. 1 through 4.

In this embodiment, however, a second inflatable ring 40' is mounted within the headliner 28' at the end of the bearing adjacent to the impeller 17'. The inflatable ring 40' has the same structure as the inflatable ring 32' and can be pressurized in the same manner to control the rate of flow from the bearing into the main pump. The principal function of the inflatable ring 40' is to provide means for adjusting the rate of flow of lubricant through the bearing. In some instances, flow rates of lubricant are greater than the rates required for good lubrication if means are not provided to restrict the flow into the main pump. The pressure of the inflatable ring in this embodiment is adjusted to produce a flow rate which is sufficient to provide proper lubrication of the bearing and to cause proper operation of the aspirator pump without excessive flow. This eliminates the excessive power consumption of the lubricant supply pump required by excessive flow.

In instances where a positive pressure exists in the main pump housing 12', when the main pump is not operating, the inflatable ring 40' may be fully inflated to prevent any flow of lubricant into the bearing. Because the inflatable ring 40' is upstreamed from the lubricant supply line 39' at such time, full inflation of the inflatable ring 40' eliminates the requirement for a check valve in a line 39'.

Figure 6:
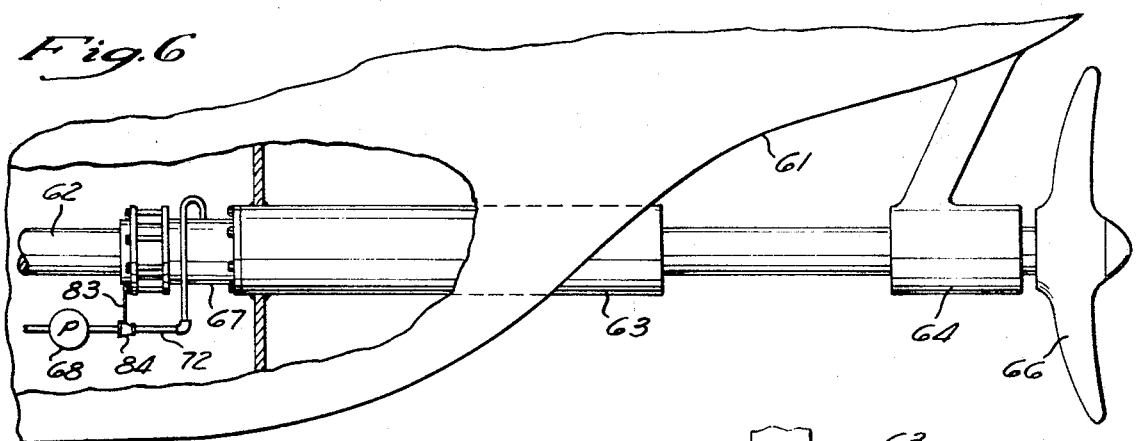
FIG. 6 is a fragmentary schematic illustration of a ship's propulsion system incorporating this invention.
Figure 7:
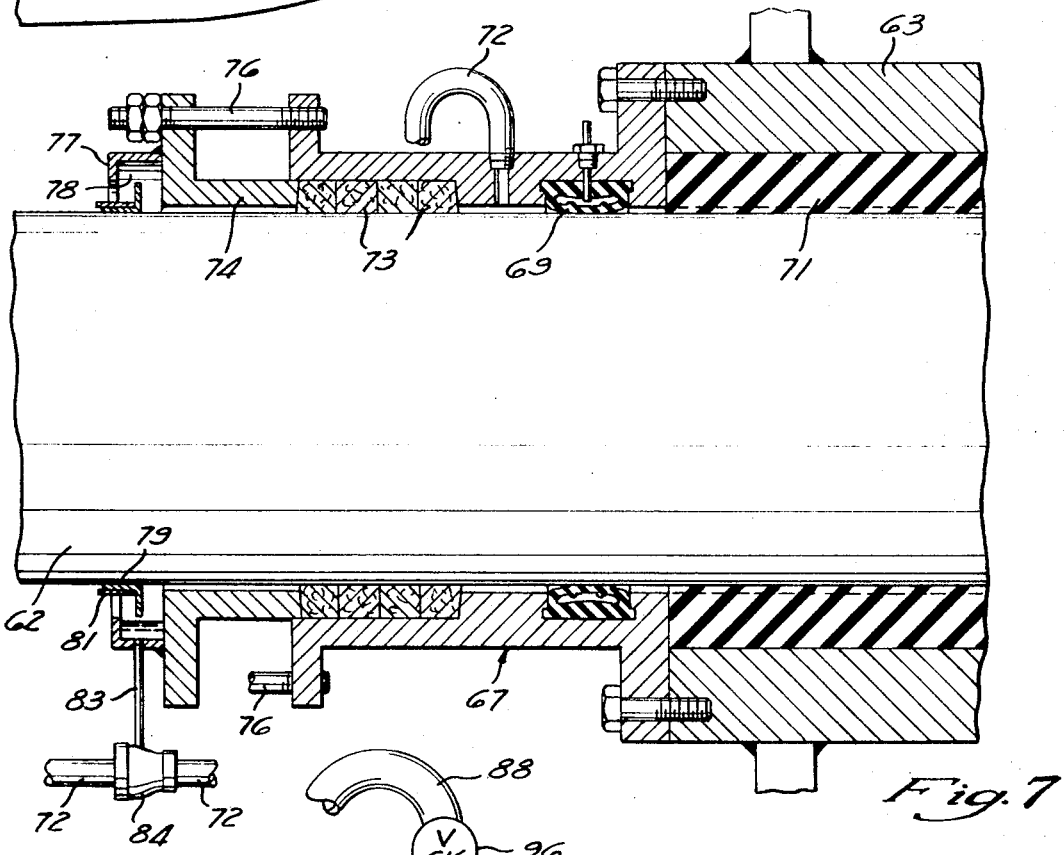
FIG. 7 is an enlarged fragmentary longitudinal section of the gland area of the propulsion system illustrated in FIG. 6.

FIGS. 6 and 7 illustrate an embodiment of this invention applied to the propulsion system of a ship in which the hull of the ship is schematically illustrated at 61. A propeller drive shaft 62 extends through a stern bearing tube 63 and outboard strut 64 to support and rotate a propeller 66. Water lubricated rubber bearings are provided in the stern tube 63 and the outboard strut 64 to journal the shaft for rotation about its central axis. At the inner end of the stern tube 63, a stuffing box assembly 67 is provided through which a water lubricant is pumped to the rubber bearing within the stern tube 63 by a pump 68.

Referring to FIG. 7, the stuffing box 67 is provided with an inflatable ring seal 69 substantially adjacent to the rearward end of the bearing stave 71 of the rubber bearing. Reference may be made to the copending application, Ser. No. 791,082, filed Jan. 14, 1969, for a more detailed description of the structure and operation of such stuffing boxes, and to the pending application, Ser. No. 653,796, filed July 17, 1967, for a detailed description of a preferred stave bearing system.

The lubricant supply is pumped from the pump 68 through a supply line 72 between the seal 69 and a packing gland 73. The packing gland 73 is adjustably compressed by a gland ring 74 which is positioned by bolt type fasteners 76. The inboard end of the gland ring 74 is formed with a collector ring 77 which provides an annular groove 78 in which the leakage of lubricant is collected. A slinger ring 79 is clamped by a clamp ring 81 to the shaft 62 to provide a radial wall within the collector groove 78. A return line 83 connects the bottom of the collector groove 78 to an aspirator 84 in the lubricant supply line 72. The structure of the aspirator may be the same as the aspirator 52 of the embodiment of FIGS. 1 through 4.

In normal operation while the shaft 62 is rotating, lubricating water is pumped through the supply line 72 and flows past the deflected ring seal 69 to the bearing staves 71. Such water is discharged through the rearward end of the bearing into the surrounding water. The packing gland 73 is adjusted so that a limited amount of leakage flows along the shaft 62. past the gland to the slinger 79. Such leakage provides lubrication and cooling for the gland. When the leakage reaches the slinger, it is thrown by centrifugal force and gravity outward into the collector groove 78 and is collected at the bottom thereof. The aspirator 84 pumps such leakage back through the return line 83 to the lubricant supply line 72 and back to the bearing. Consequently, no leakage of bearing lubricant reaches the ship's bilge.

In this embodiment the seal 69 is inflated when the ship is not under way and the shaft is not rotating. When inflated, the seal 69 provides a positive seal to prevent leakage of external water in through the bearing and gland, thus preventing accumulation of water in the bilge when the ship is not under way and when the pump 68 is not functioning to supply lubricant to the bearing. Prior to starting the shaft, the seal 69 is deflated and the pump 68 is operated to supply lubricant to the bearing. Since leakage is prevented, both when the ship is under way and when the ship is not under way, there is no accumulation of lubricant leakage water in the ship's bilge.

Figure 8:
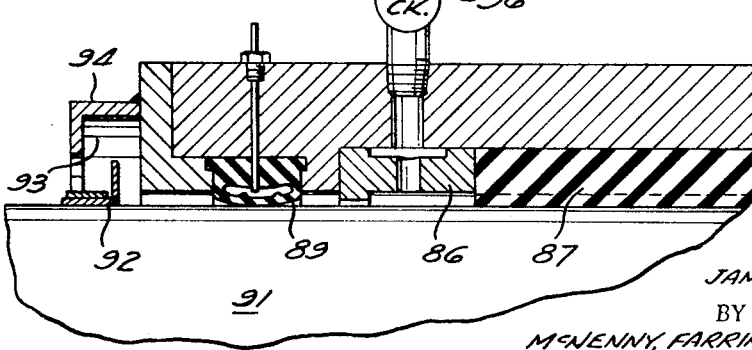
FIG. 8 is an enlarged fragmentary section of an embodiment of a ship's propulsion system similar to FIG. 6 in which the gland is replaced by an inflatable restricter and seal.

FIG. 8 illustrates a second embodiment of a ship's propulsion system in which an inflatable seal is used both to control the rate of leakage while the ship is under way, and to prevent leakage when the ship is not under way. In this embodiment a lantern ring 86 is provided at the inboard end of the staves 87 through which lubricant is pumped from the lubricant supply 88. In this embodiment, however, a packing gland is not utilized to control the leakage while the ship is under way. Instead, an inflatable ring 89 is provided inboard of the lantern ring 86 to control the rate of leakage inboard along the shaft 91 while the ship is under way. Here again, a slinger 92 is located within the collector groove 93 of a collector ring 94, and a return line and aspirator similar to the return line 83 and aspirator 84 illustrated in FIG. 7 are utilized to pump the leakage from the collector groove 93 back into the supply line 88.

When the ship is under way, the pressure in the inflatable ring 89 is adjusted to provide the desired rate of leakage along the shaft 91. The rate must be sufficient to provide lubrication for the ring to prevent its wear, but must be sufficiently slow so that the aspirator system has capacity to pump the leakage back into the bearing. Here again, Venturi type jet pumps may be utilized instead of an aspirator if desired. When the ship is not under way, the ring seal 89 is further inflated to positively prevent leakage along the shaft 91 into the bilge. A check valve 96 is provided in the line 88 to prevent reverse flow while the pump is not supplying lubricant under pressure. Such check valve is not required in the embodiment of FIGS. 6 and 7 since the seal 69, when inflated, prevents the water from reaching the supply line 72. A second inflatable seal ring may also be used on the sternward side of the lantern ring 86 instead of a check valve to provide a positive seal.

In all of the embodiments of this invention, means are provided to prevent the accumulation of lubricant leakage and to recirculate such leakage back through the bearing. Consequently, the problem of leakage accumulation is eliminated without requiring separately driven pump means to dispose of the accumulated leakage. Further, in the preferred forms of this invention, an inflatable ring is provided to control the rate of leakage while the system is operating and to positively prevent all leakage when the system is not operating. Such inflatable ring, in most instances, is used to replace the packing gland utilized in prior systems, thus eliminating the power loss and wear occurring in such glands.

Although preferred embodiments of this invention are illustrated, it is to be understood that various modifications and rearrangement of parts may be resorted

What is claimed is:

1. A forced lubricated bearing system comprising a bearing, a shaft journaled in said bearing, lubricant supply means operable to supply lubricant to said bearing under pressure for flow therethrough, restricter means located at least at one end of said bearing operable to permit restricted leakage of said lubricant from one end of said bearing, collector means operable to collect said leakage of lubricant, and pump means operating in response to flow of lubricant from said supply means to said bearing to automatically pump said leakage of said lubricant back into said bearing.

2. A forced lubricated bearing system as set forth in claim 1 wherein said bearing is a water lubricated bearing.

3. A forced lubricated bearing system as set forth in claim 2 wherein said pump means is an aspirator pump connected between said lubricant supply means and said bearing.

4. A forced lubricated bearing system as set forth in claim 3 wherein said collector means includes an annular collector groove around said shaft, and a radially extending surface on said shaft within said collector groove facing in a direction axially away from said bearing.

5. A forced lubricated bearing system as set forth in claim 4 wherein said restricter means includes a seal operable to prevent said leakage of lubricant when said shaft is stationary.

6. A forced lubricated bearing system as set forth in claim 5 wherein said seal is inflatable to prevent leakage when said shaft is stationary and deflatable to permit flow of lubricant therepast when said shaft is moving.

7. A forced lubricated bearing system as set forth in claim 5 wherein said seal is inflatable to prevent leakage when said shaft is stationary and partially inflated to permit said restricted leakage of said lubricant from said one end of said bearing when said shaft is moving.

8. A forced lubricated bearing system as set forth in claim 7 wherein said bearing is a water lubricated elastomeric bearing and said seal is formed of elastomeric material.

9. A bearing system comprising a bearing, a shaft journaled in said bearing, lubricant between said bearing and said shaft, restricter means located at least at one end of said bearing operable to permit restricted leakage of said lubicant from said one end of said bearing, collector means operable to collect said leakage of lubricant, said restricter means including a seal fully inflatable to prevent said leakage of lubricant when said shaft is stationary and partially inflatable to permit said restricted leakage when said shaft is moving, and means to pump said leakage of lubricant from said collector means back into said bearing.

10. A bearing system as set forth in claim 9 wherein pressure means are provided to supply said lubricant to said bearing for flow therethrough, and said pump means operates in response to said flow of lubricant to said bearing.

11. A bearing system as set forth in claim 10 wherein said collector means includes an annular groove around said shaft and a generally radially extending surface on said shaft within said groove facing in a direction away from said bearing.

12. A forced lubricated bearing system comprising a bearing, a shaft journaled in said bearing, lubricant supply means operable to supply lubricant to said bearing under pressure for flow therethrough, restricter means located at least at one end of said bearing operable to permit restricted leakage of said lubricant from one end of said bearing, collector means operable to collect said leakage of lubricant, pump means to automatically pump said leakage of said lubricant back into said bearing, and check valve means preventing backflow of lubricant through said lubricant supply means.

* * * * *